May 8, 1951 R. D. COLLINS 2,551,929
AUTOMOBILE JACK AND COVER
Filed Jan. 13, 1947
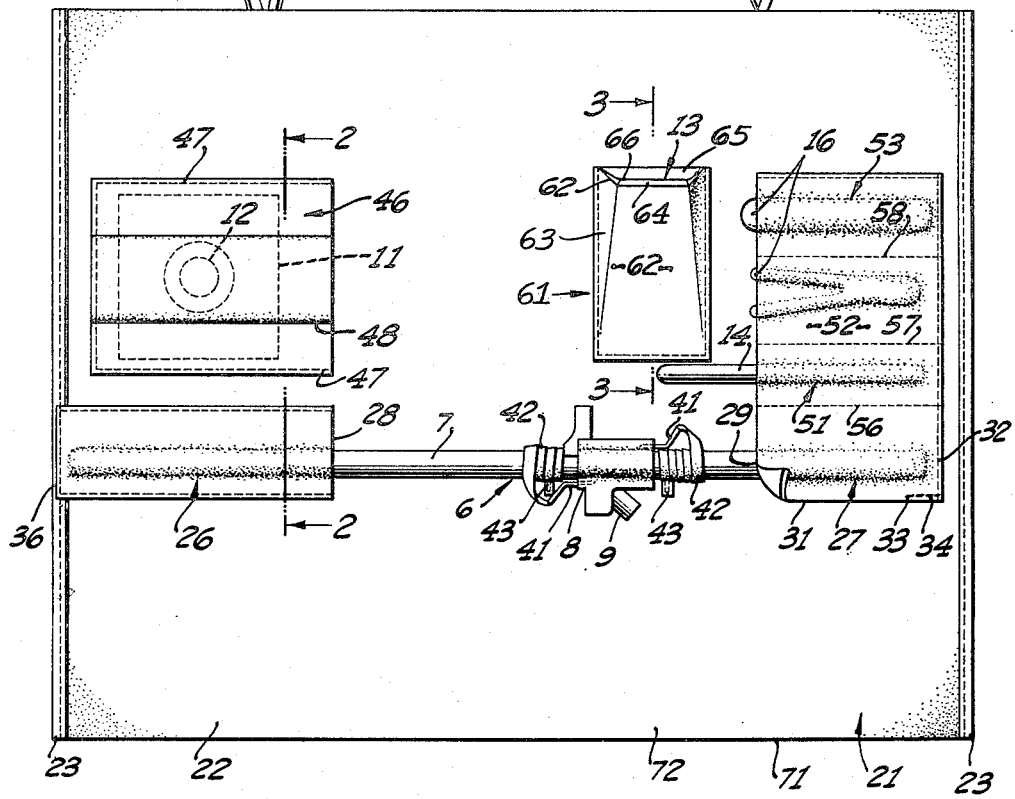
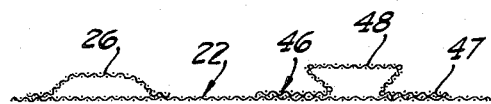
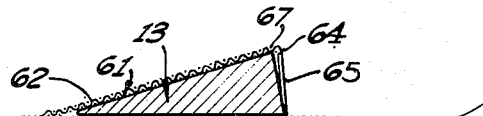
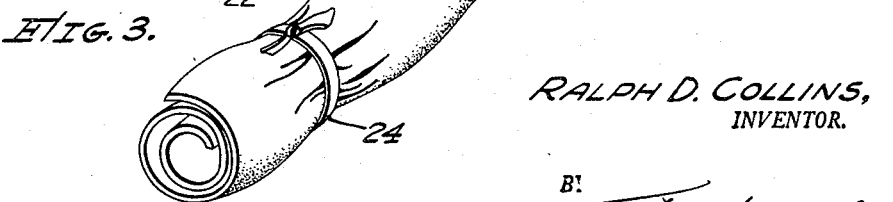
RALPH D. COLLINS,
INVENTOR.
BY *Stuart M. Maule*
ATTORNEY.

Patented May 8, 1951

2,551,929

UNITED STATES PATENT OFFICE 2,551,929

AUTOMOBILE JACK AND COVER

Ralph D. Collins, Beverly Hills, Calif.

Application January 13, 1947, Serial No. 721,765

1 Claim. (Cl. 206—16)

This invention relates to special receptacles and packages and has for an object the provision of a cover designed to afford convenience as a storage place for a kit of specialized tools.

A more detailed object is to provide a container for the storage of the tools ordinarily required in changing an automobile tire, of such a nature as to afford the best protection for the tools so as to preserve them in proper operating condition and also to eliminate the tendency for the tools to rattle when carried within the conventional tool storage compartment of an automobile and yet to make the tools readily accessible and easily removable from the container when desired for use.

A still further object is to provide a cover for the kit of tools ordinarily required in changing an automobile tire, which can be produced rapidly and in relatively large numbers at a minimum of cost and yet which is generally superior in performing the functions for which it is designed.

The invention possesses other objects and features of advantage, some of which, with the foregoing, will be set forth in the following description of the preferred form of my invention which is illustrated in the drawing accompanying and forming part of the specification. It is to be understood that I do not limit myself to the showing made by the said drawing and description, as I may adopt variations of the preferred form within the scope of my invention as set forth in the claim.

Referring to the drawings:

Figure 1 is a top plan view of a cover for a kit of tools, incorporating the principles of the present invention. The cover is shown in its fully opened position to disclose the manner in which the tools are fitted thereto.

Figure 2 is a transverse vertical section taken upon the line 2—2 of Figure 1 with the direction of view as indicated. This view discloses details of two of the tool-containing pockets with the tools removed.

Figure 3 is a view similar to Figure 2 but taken upon the line 3—3 of Figure 1 with the direction of view as indicated through another of the pockets and the associated tool in the position which it is intended to occupy within that pocket.

Figure 4 is a perspective view showing the cover rolled with the tools contained therein.

The cover of the present invention has been designed as a receptacle for a kit of tools conventionally provided as standard equipment for an automobile required for use in changing a tire. Such a kit of tools ordinarily includes a jack 6 in the form of an elongated standard 7 upon which a head 8 can be caused to move up and down by reciprocating a handle 9. This type of jack 6 is commonly known as a "bumper" jack which, because it is intended to be operated by engagement with a bumper of the car instead of with the car's axle, requires that its standard 7 be relatively long because of the greater lift required in order to lift a wheel from the ground. Jacks of this type are regularly provided with a base such as that indicated at 11 in the form of a substantially flat plate adapted to rest upon the ground and to receive the lower end of the standard 7 of the jack in a socket 12 provided upon the upper surface of the plate. Kits of this nature also frequently include a wedge 13 which is useful in chocking one of the wheels remaining upon the ground while a tire is being changed, an extension 14 for the handle 9 of the jack 6 and usually an assortment of wrenches such as those indicated at 16.

Because of the wide range of sizes of such an assortment of tools it has not been conventional practice heretofore to provide a receptacle for their storage but merely to deposit them loosely in the car's tool compartment where they are unprotected against rusting and where they are most apt to cause considerable annoyance, while the car is being operated, because of the tendency to rattle as a consequence of the car's motion.

The cover of the present invention is intended to overcome these disadvantages of the conventional method of storing tire-changing tools of an automobile. With this object in view, the cover of my invention, which is indicated in its entirety at 21, comprises a sheet 22 of flexible material, preferably fabric such as canvas of suitable weight. The sheet 22 is preferably hemmed at each end as indicated at 23 and is provided with tie strips 24 on its outer surface with which the cover 21 can be encircled and tightly tied with the tools thereinside as indicated in Figure 4.

Upon the inner surface of the sheet 22 a plurality of tool-receiving pockets are provided. Two of these pockets, as indicated respectively at 26 and 27, are disposed adjacent opposite ends of the sheet 22, the bottom of each pocket 26, 27 being proximal to the associated end of the sheet with the result that the open ends 28 and 29, respectively, are directed toward each other. These two pockets are in alignment considered longitudinally of the sheet 22, and they are spaced apart such a distance that the standard 7 of the jack 6 is adapted to be stored within the cover 21 by having one end disposed within each of the two pockets 26, 27 with the intermediate portion of the standard 7 extending between the two pockets 26 and 27, as shown in Figure 1, and with the reciprocable head 8 upon the intermediate portion of the standard and hence also disposed between these two pockets. In order to facilitate placing the jack 6 within the pockets as described, and removal of the jack therefrom when it is desired for use, one of these two pockets, say the pocket 27, is also left open, i. e., detached from the sheet 22, along one side edge 31 from the pocket's open end toward its closed end or bottom 32, to a point 33 spaced a short distance from the bottom 32. The stitching 34 whereby the remainder of the pocket 27 is attached to the sheet 22 extends from the bottom 32 to the point 33, thus providing an abutment at the lower end of the side 27, i. e., the end of the side 27 nearest the bottom 32. This abutment is adapted to retain the associated end of the jack's standard 7 within the pocket 27 against inadvertent displacement. However, the distance from the point 33 in the open side of the pocket 27 to the bottom 36 of the opposite pocket 26 is slightly greater than the length of the standard 7, with the result that by sliding the jack 6 to the left as viewed in Figure 1 until one end of the standard 7 fits snugly against the bottom 36 of the pocket 26, the opposite end of the standard 7 can be removed from the pocket 27 by moving the associated end of the standard 7 laterally out of the open side 31 of the pocket 27, whereupon the other end of the standard 7 can be withdrawn from its pocket 26. However, owing to the presence of the abutment provided by the short run of stitching 34, requiring that the jack be slid rather forcibly in the opposite direction before its end will clear the abutment, the jack will be retained in position with the ends of its standard 7 within the pockets 26 and 27 until such time as it is removed in the manner described.

Owing to the fact that the heads 8 of jacks 6 of this general type are usually mounted rather loosely upon the standards 7, I have also provided means for wedging the head 8 securely to the standard 7 so as to immobilize it with respect thereto and thus eliminate any tendency for the head to rattle upon the standard as it might otherwise do even when enclosed within the wrapped cover 22. With this object in view, I have provided a small wedge 41, preferably of metal, at the free end of each of two flexible tapes 42. The other end of each of these tapes is secured as by stitching 43 to the inner face of the sheet 22 preferably in position closely adjacent that which is to be occupied by the jack 6 when mounted within the opposed pockets 26 and 27. Each of the wedges 41 is dimensioned so that it is adapted to have its smaller end wedged between the standard 7 of the jack and one of the two ends of the head 8, as illustrated in Figure 1, so as to secure the head 8 tightly in position upon the standard. As each of the tapes 42 may be wound around the standard 7, two or three times before its associated wedge 41 is forced into the space between the associated end of the head 8 and the standard, the tapes 43 also can serve to immobilize the entire jack 6 with respect to the pockets 26 and 27 and thus add to the security with which the jack 6 is restrained against inadvertent removal from the pockets.

In addition to the standard-receiving pockets 26 and 27 several additional pockets are provided upon the inner face of the sheet 22. A relatively large pocket 46 secured as by stitching 47 throughout three of its edges to the sheet 22, serves as a retainer for the base 11 of the jack. Inasmuch as the socket 12 of the base 11 is of substantial thickness as compared with the thickness of the remainder of the plate 11, I prefer to fashion the pocket 46 with a pleat 48 permitting the pocket 46 to be opened wide enough to receive the plate 11 and its socket 12.

Preferably a row of pockets 51, 52, and 53 are also provided upon the inner surface of sheet 22 and it has been found convenient to form these pockets as a lateral extension of the same sheet of material as that of which the pocket 27 is formed, the pockets of this row being spaced from each other by rows 56, 57, and 58 of stitching, as clearly shown in Figure 1. These pockets serve as convenient receptacles for such tools and accessories as the extension handle 14 for the jack 6 and an assortment of wrenches, pliers, or the like.

Still another pocket 61 is also provided upon the inner surface of the sheet 22 for the accommodation of the wedge or chock 13. This pocket 61 is defined by a front panel 62 connecting the outer edges of two spaced side walls 63, which are wedge shaped, the point of the wedge being at the bottom of the pocket, and the wider portion at the top. This disposes the front panel 62 of the pocket 61 in position with its upper edge spaced outwardly from the sheet 22, leaving the top of the pocket open, while the bottom edge of the front panel 62 is stitched directly to the sheet 22, with the result that in transverse vertical section the pocket 61 tapers from its widest portion at the top to its narrowest portion at the bottom, as clearly illustrated in Figure 3. The opening at the top of the pocket, however, is somewhat restricted by means of a relatively narrow inturned flange 64 which encircles the mouth 65 of the pocket and which is formed of the same sheet of material as that of which the pocket 61 is formed. The flange 64 is gathered and stitched at preferably a plurality of locations, such as at the two corners of the mouth 65 which are spaced outwardly from the sheet 22, thus forming plaits 66. The effect of so gathering and stitching the flange 64 is to decrease its length, i. e., its dimension measured from end to end, around the periphery of the pocket's open upper end. This length of the flange is therefore less than the sum of the upper edges of the front panel 62 and the two side walls 63 of the pocket, with the result that the flange is drawn relatively taut and inwardly over the upper end of the wedge when the wedge 13 is disposed within the pocket 61, it being understood that the pocket is so proportioned that the wedge 13 fits rather tightly therein. The tension thus imposed upon the flange 64 causes it to retain its position wherein it is deflected around the corner 67 at the larger end of the wedge (see Figure 3) with a sufficient degree of firmness to require that the flange be stretched slightly in order for the larger end of the wedge to move therepast.

The two opposed, jack-receiving pockets 26 and 27, are spaced laterally inwards from one of the side edges 71 of the sheet 22 and all of the other pockets 46, 51, 52, 53, and 61 are disposed still further from the edge 71 thus leaving a portion 72 of the sheet 22 between the edge 71 and the pockets which forms an unobstructed flap capable of being folded over the jack 6 after the latter has been positioned within the pockets 26, 27, such folding of the flap constituting the preliminary step toward wrapping the cover 21 so as to encase the tools therein while the tools are disposed within their respective pockets as described hereinabove.

I claim:

In combination, an automobile jack including an elongated standard and a cover for said jack comprising a sheet of flexible material, a pair of pockets on one side of said sheet, said pockets being in spaced apart opposed relation in alignment with each other, each of said pockets being open at the end thereof adjacent the other of said pockets with the ends of said standard within said pockets and the intermediate portion of said standard extending between said pockets, and one of said pockets being open from said open end thereof only part way along one side toward the bottom thereof to a point spaced a distance from the bottom of the opposite pocket substantially equal to the length of said standard whereby the associated end of said standard can be moved laterally into and out of said open-sided pocket while the other end of said standard is disposed within said opposite pocket.

RALPH D. COLLINS.

REFERENCES CITED

The following references are of record in the file of this patent:

UNITED STATES PATENTS

| Number | Name | Date |
| --- | --- | --- |
| D. 114,210 | Florman | Apr. 11, 1939 |
| 1,094,099 | Parkhurst | Apr. 21, 1914 |
| 1,316,815 | St. Pierre | Sept. 23, 1919 |
| 1,434,350 | Collins | Oct. 31, 1922 |
| 1,500,991 | Heitler | July 8, 1924 |
| 1,684,232 | Levit | Sept. 11, 1928 |
| 1,896,761 | Wheary et al. | Feb. 7, 1933 |
| 1,924,910 | Buxton | Aug. 29, 1933 |